(12) United States Patent
DeCenzo et al.

(10) Patent No.: US 8,024,602 B2
(45) Date of Patent: Sep. 20, 2011

(54) MULTIPATH REDUNDANT STORAGE SYSTEM ARCHITECTURE AND METHOD

(75) Inventors: David Peter DeCenzo, Pueblo, CO (US); William A. Pagano, Colorado Springs, CO (US); Stephen J. Sicola, Monument, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/173,001

(22) Filed: Jul. 14, 2008

(65) Prior Publication Data

US 2008/0276033 A1 Nov. 6, 2008

Related U.S. Application Data

(63) Continuation of application No. 10/817,565, filed on Apr. 2, 2004, now abandoned.

(51) Int. Cl.
*G06F 11/00* (2006.01)
(52) U.S. Cl. ...................................................... 714/5.11
(58) Field of Classification Search .................. None
See application file for complete search history.

(56) References Cited

U.S. PATENT DOCUMENTS

| | | | |
|---|---|---|---|
| 5,134,619 A | 7/1992 | Henson et al. | |
| 5,255,221 A | 10/1993 | Hill | |
| 5,274,645 A * | 12/1993 | Idleman et al. | 714/6 |
| 5,586,250 A | 12/1996 | Carbonneau et al. | |
| 5,790,775 A * | 8/1998 | Marks et al. | 714/9 |
| 5,875,314 A | 2/1999 | Edholm | |
| 5,898,828 A | 4/1999 | Pignolet et al. | |
| 5,944,838 A * | 8/1999 | Jantz | 714/6 |
| 6,061,750 A | 5/2000 | Beardsley et al. | |
| 6,145,028 A | 11/2000 | Shank et al. | |
| 6,192,027 B1 | 2/2001 | El-Batal | |
| 6,304,942 B1 | 10/2001 | DeKoning | |
| 6,401,170 B1 | 6/2002 | Griffith et al. | |
| 6,477,139 B1 | 11/2002 | Anderson et al. | |
| 6,598,106 B1 | 7/2003 | Grieshaber et al. | |
| 6,636,934 B1 | 10/2003 | Linnell et al. | |
| 6,678,268 B1 | 1/2004 | Moody et al. | |
| 6,874,100 B2 | 3/2005 | Rauscher | |
| 6,883,065 B1 * | 4/2005 | Pittelkow et al. | 711/114 |
| 6,883,108 B2 | 4/2005 | Lee et al. | |
| 6,895,485 B1 | 5/2005 | DeKoning et al. | |
| 6,906,918 B2 * | 6/2005 | Rabinovitz | 361/687 |
| 6,996,741 B1 * | 2/2006 | Pittelkow et al. | 714/5 |
| 7,003,687 B2 | 2/2006 | Matsunami et al. | |
| 7,003,688 B1 * | 2/2006 | Pittelkow et al. | 714/7 |

(Continued)

*Primary Examiner* — Nadeem Iqbal
(74) *Attorney, Agent, or Firm* — McCarthy Law Group

(57) ABSTRACT

Disclosed is a storage system and method that provides multi-path bus and component interconnection and isolation in a data storage system. A plurality of data storage devices in a removable assembly are connected to a fabric that is configurable to connect some or all of the data storage devices (or "drives") to a drive controller and configurable to isolate one or more data storage devices from the drive controller. Multiple controllers, fabrics, and interconnecting buses may be employed to provide redundancy in the event of a connector, bus, or controller failure. Computer program code operating in a host, interface controller, and/or drive controller configures the fabric to isolate failed devices and may be employed to optimize data transfer rates. Data storage devices may be multi-ported. The fabric may comprise any device or devices capable of configurably interconnecting data storage devices to one or more controllers and may comprise multiplexers, cross point switches, port bypass controllers. Fabrics may also provide translation or conversion of one bus or interface format to another format.

18 Claims, 13 Drawing Sheets

U.S. PATENT DOCUMENTS

| | | |
|---|---|---|
| 7,043,663 B1 * | 5/2006 | Pittelkow et al. .................. 714/4 |
| 7,127,633 B1 * | 10/2006 | Olson et al. ........................ 714/4 |
| 7,216,264 B1 * | 5/2007 | Glade et al. ...................... 714/48 |
| 2002/0065962 A1 | 5/2002 | Bakke et al. |
| 2002/0194407 A1 | 12/2002 | Kim |
| 2003/0023705 A1 | 1/2003 | Kim |
| 2003/0041201 A1 | 2/2003 | Rauscher |
| 2003/0126315 A1 | 7/2003 | Tan et al. |
| 2003/0221042 A1 | 11/2003 | Watkins et al. |
| 2004/0030766 A1 | 2/2004 | Witkowski |
| 2004/0030826 A1 | 2/2004 | Knapp, III |
| 2004/0093411 A1 | 5/2004 | Elzur et al. |
| 2004/0139260 A1 * | 7/2004 | Steinmetz et al. ............ 710/269 |
| 2005/0228943 A1 | 10/2005 | DeCenzo et al. |

* cited by examiner

MULTIPATH REDUNDANT STORAGE SYSTEM ARCHITECTURE AND METHOD

RELATED APPLICATIONS

This is a continuing application that claims the benefit of the earlier filing date of application Ser. No. 10/817,565 filed on Apr. 2, 2004.

FIELD

The present embodiments pertain generally to data storage systems and more specifically to a system and method of interconnection of storage components in fault tolerant data storage systems.

BACKGROUND

Data storage systems may comprise one or more drives connected to one or more drive controllers that are connected to a host or network interface. Each component of the storage system, such as drives, controllers, connectors, and wiring are a potential point of failure in the system. Some systems, such as personal computers, for example, may lose access to data in the event of a failure of a controller, bus, or connector. Access to data may require that a failed component be repaired or replaced or that a drive be installed in another system to access data. Failure of a drive usually results in loss of stored data. Larger storage systems may employ redundancy methods such as RAID to distribute data across a plurality of drives such that data is not lost in the event of a drive failure. In a RAID system, data from the failed drive may be copied from a mirror drive, or the data may be reconstructed from data and parity information on functioning drives. After the failure of a drive or controller, the system may often operate in a reduced performance condition until failed components are replaced or repaired. Failure of a bus may require removal of drives and installation of the drives in another fixture or system in order to access data.

The level of fault tolerance, storage capacity, operating life, and data availability are key contributors to the value of a storage system. Fault tolerance may be expressed in terms of the number of failures (both sequential and simultaneous) of drives, controllers, and buses that may be incurred while still maintaining data integrity and data access. Storage capacity reflects the number of drives, capacity of each drive, and data encoding methods used. As the number of drives increases, the number of interconnections and likelihood of failure increases. Storage system operating life is reflected in the longevity of components and level of fault tolerance of the system. Spare drives may be employed to store copied or reconstructed data to extend operation of the system after the failure of a drive. Data availability may be expressed in terms of data transfer rates, fault tolerance, and system performance following failure of one or more components.

The commercial viability of a storage system reflects the architectural decisions and component selections made by the designer to provide a desired level of fault tolerance, storage capacity, operating life, and data availability. Components with very long MTBF (mean time between failure) ratings may adversely affect system cost.

SUMMARY

Embodiments of the present invention furnish redundant storage system architectures and isolation methods that provide fault tolerance in data storage systems and that can be employed to eliminate single points of failure.

DETAILED DESCRIPTION

Embodiments of the present invention provide redundant components and data paths, and isolation of points of failure within a storage subsystem such that data access may be maintained following failure of a bus or component.

Embodiments of the present invention are applicable to differing storage architectures including systems that employ arrays of single or multiple drives installed in cabinet fixtures and systems that employ removably installable multiple drive assemblies. A multiple drive assembly is defined as a removably installable unit of a predefined size, shape and connector configuration that can contain differing internal data storage devices, components and configurations. In one embodiment, a multiple drive assembly may comprise a first number of 3½-inch form factor drives while another embodiment may comprise a different number of 2½-inch form factor drives. Various multiple drive assembly embodiments may be installed into a single fixture design. This allows a single fixture (cabinet, shelf, etc.) design to be used to produce systems of varying storage capacity, data rate, and processing power. Multiple drive assembly embodiments may vary in complexity, ranging from units that contain only drives and connectors to units that comprise drives, one or more fabrics, one or more drive controllers, and one or more interface controllers. Multiple drive assembly embodiments may employ interfaces such as fibre channel, for example, that allow devices ranging from simple storage devices, to intelligent drive and interface controllers to be used while employing the same connectors. Computer program code operating in a host or other system reflects the complexity of the multiple drive assembly. Multiple drive assemblies may simplify storage system assembly and upgrade, and may reduce the likelihood of radio frequency emissions. A multiple drive assembly receptacle is defined as a receptacle in a shelf, rack, enclosure, or other fixture into which individual multiple drive assemblies that can vary in internal architecture can be removably installed. Embodiments of the present invention may be employed to create storage systems wherein a multiple drive assembly may be considered a "maintenance-free" storage appliance. Multiple drive assembly embodiments may provide one or more spare drives, multiple buses and spare controller capacity such that it may operate for extended periods without user intervention, even after failure of a bus, controller, and/or one or more drives. Embodiments of the preset invention may provide levels of fault tolerance sufficient to provide high performance operation after component failures.

Figure 1:
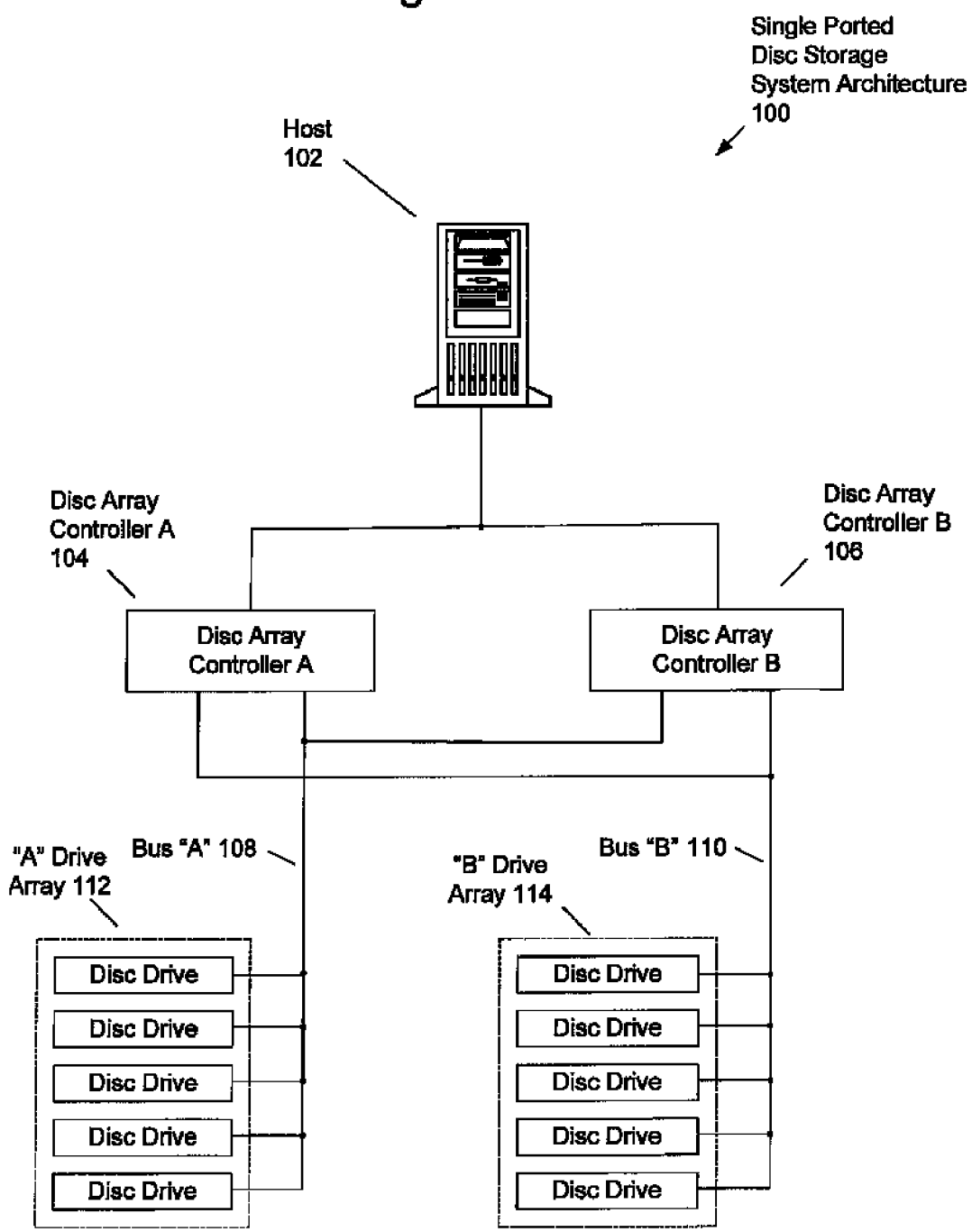
FIG. 1 depicts a single-ported storage system architecture.

FIG. 1 depicts a single-ported storage system architecture. System 100 comprises host 102, array controller "A" 104, array controller "B" 106, bus "A" 108, bus "B" 110, "A" drive array 112, and "B" drive array 114. Drive arrays are depicted as having five drives each. The drives in "A" drive array 112 and "B" drive array 114 are single-ported in that they provide a single interface to either bus "A" 108 or to bus "B" 110. Drive controller "A" 104 and drive controller "B" 106 are connected to host 102 by one or more buses and are dual ported in that they each provide two drive bus interfaces. The interfaces of each array controller are configured such that either controller can support communications on both bus "A" 108 and bus "B" 110, providing continued operation if either one of the controllers should fail. Depending on the number of drives in each array, and the data transfer rates for the drives in the arrays, the system may operate at a reduced data rate after the failure of one of the controllers. Failure of either bus "A" 108 or bus "B" 110, associated connectors, or corruption of bus signals by a connected component, completely inhibits any access to data stored in an array attached to the bus. As such bus "A" 108, bus "B" 110, and any associated connectors and attached components that may corrupt the bus represent a single point of failure. Recovery of stored data requires that either the bus be repaired, or that drives be removed and installed in a fixture with a functioning bus. In terms of data availability, the architecture of FIG. 1 may provide reduced availability in the event of a controller failure, or a drive failure that does not affect the bus, and provides no data availability in the event of a bus failure, or failure of a drive or controller that affects the bus.

Figure 2:
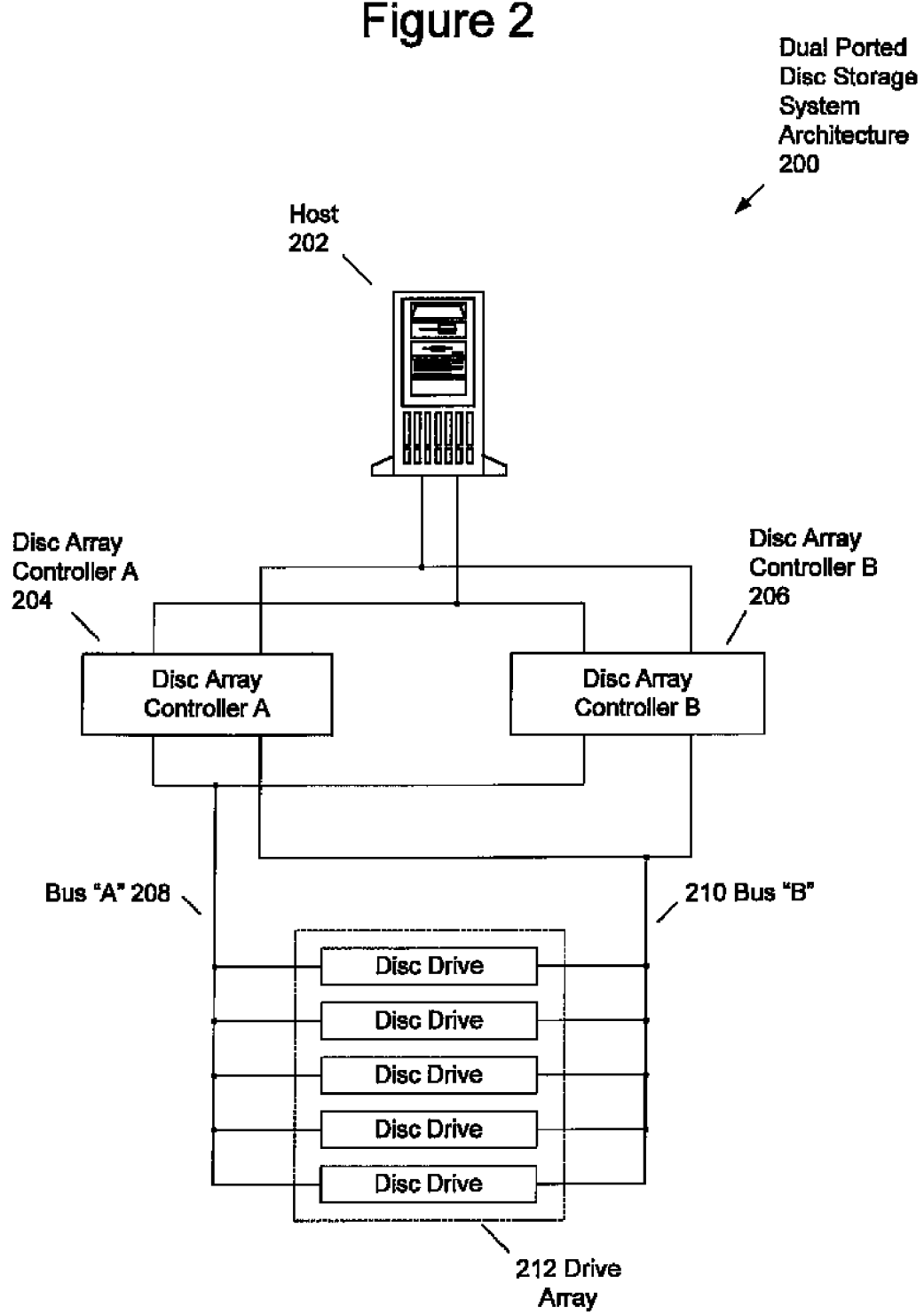
FIG. 2 depicts a dual-ported storage system architecture.

FIG. 2 depicts a dual-ported storage system architecture. System 200 comprises host 202, array controller "A" 204, array controller "B" 206, bus "A" 208, bus "B" 210, and "B" drive array 212. The drives in drive array 212 are dual-ported in that they each provide a single interface to both bus "A" 208 and to bus "B" 210. Drive controller "A" 204 and drive controller "B" 206 are connected to host 202 by at least one bus, and in the preferred embodiment, at least two buses. Drive controller "A" 204 and drive controller "B" 206 are dual-ported in that they each provide two drive bus interfaces. The interfaces of each drive array controller are configured such that either controller can support communications on both bus "A" 208 and bus "B" 210, providing continued operation if either one of the controllers should fail. The dual-ported nature of array 212 allows drives in the array to communicate with either drive array controller. In the event of a bus or controller failure, the system continues to provide data access. Access may be at a reduced rate depending on the transfer rate and number of drives in the array. Compared to the system of FIG. 1, the architecture depicted in FIG. 2 provides the benefit of continued data availability after the failure of a bus, but at the increased cost of using dual-ported drives. The architectures of FIGS. 1 and 2 may be representative of systems using parallel or serial bus interfaces such as SCSI, serial SCSI, serial ATA, or fibre channel, for example.

Figure 3:
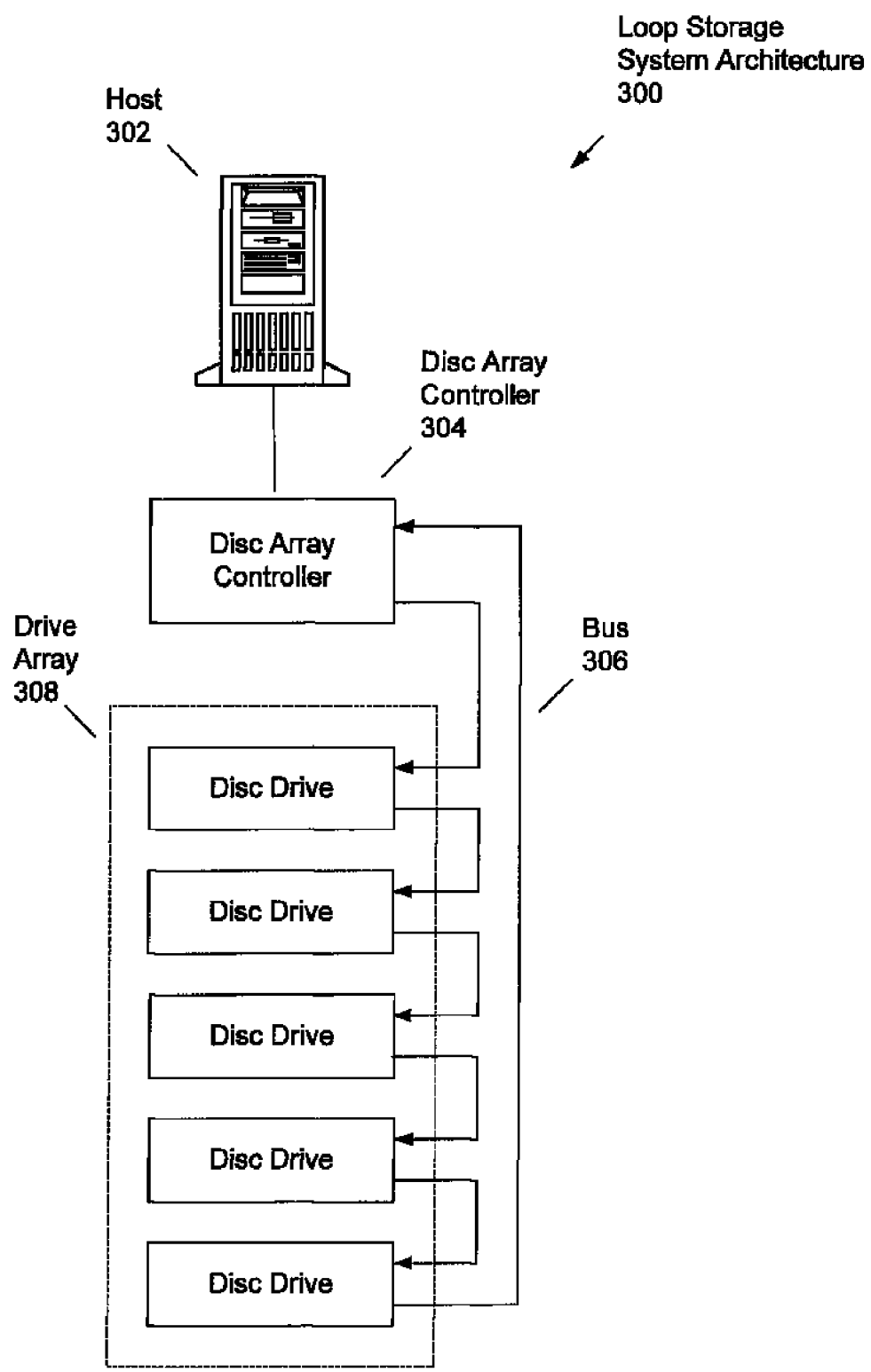
FIG. 3 depicts a loop storage system architecture.

FIG. 3 depicts a loop storage system architecture. System 300 comprises host 302, drive array controller 304, bus 306, and drive array 308. Drive array controller 304 is connected to host 302 by one or more buses. Bus 306 serially interconnects drive array controller 304 and each of the drives of drive array 308 in a loop. Drive array controller 304 and each drive of drive array 308 have on input port and an output port to connected to form the loop of bus 306. The system of FIG. 3 can continue to operate if a drive failure occurs that does not affect bus operation. The failure of the bus, controller, or a drive failure that interrupts bus operation results in loss of data availability, requiring repair of the bus, controller, or drive, or installation of drives in another fixture to access data.

Figure 4:
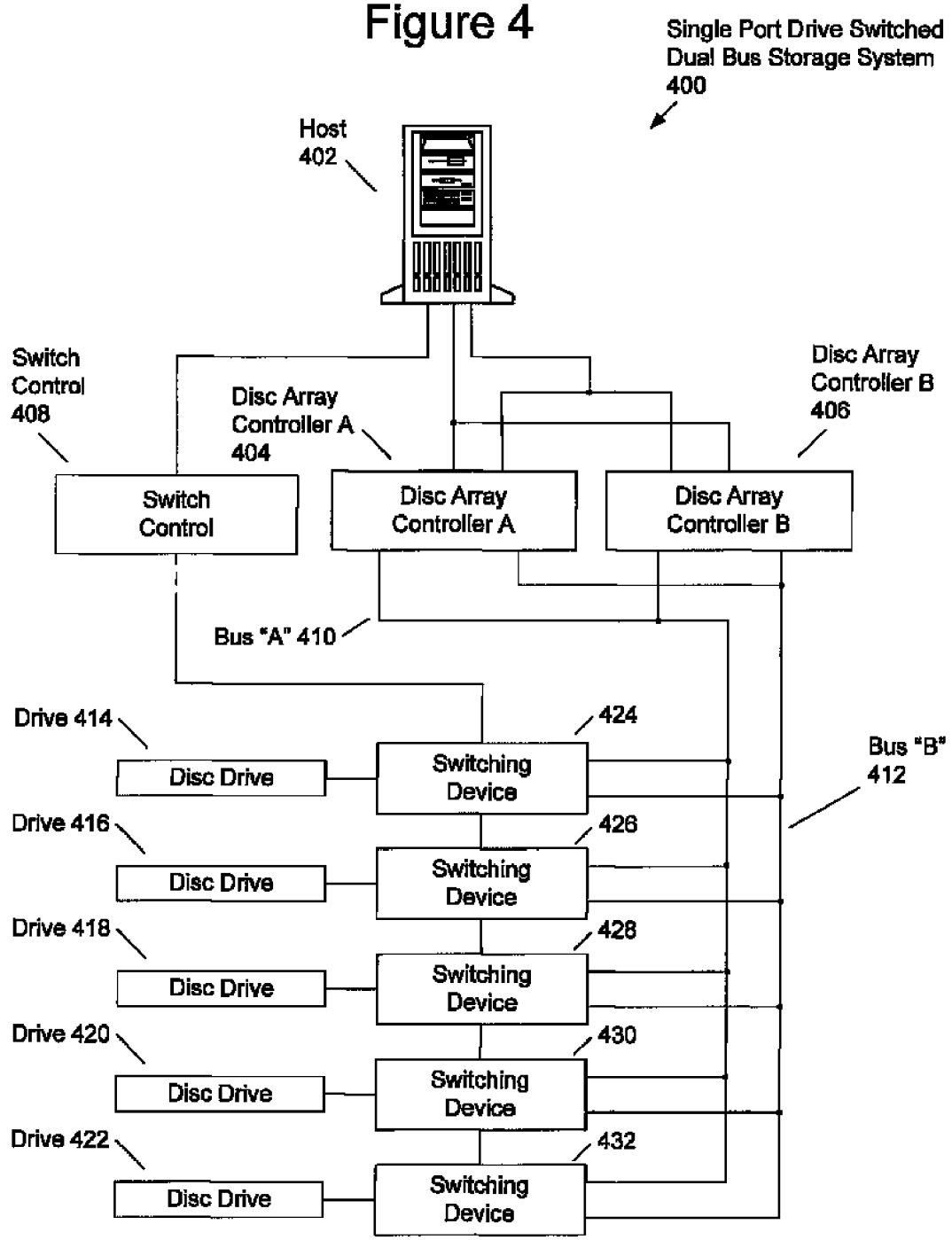
FIG. 4 depicts a storage system architecture employing switched single-ported drives.

FIG. 4 depicts a storage system architecture employing switched single-ported drives. System 400 comprises host 402, drive controller "A" 404, drive controller "B" 406, switch control 408, bus "A" 410, bus "B" 412, drives 414-422 and switching devices 424-432. Drive controller "A" 404 and drive controller "B" 406 are connected to host 402 by one or more buses and are dual ported that that they each provide two drive buses. Bus "A" 410 and bus "B" 412 are connected to both drive controller "A" 404 and drive controller "B" 406. In an alternative embodiment (not depicted), two single port drive controllers can be used wherein a first drive controller provides communication on bus "A" 410 and a second drive controller provides communications on bus "B" 412. Switching devices 424-432 are controlled by switch control 408 and independently connect drives 414-422 to bus "A" 410 or bus "B" 412. Switching devices 424-432 may be any type of switching devices including but not limited to cross-point switches, port multiplexers and the like. Switch control may comprise one or more buses that connect switching devices 424-432 to host 402 and may comprise an I2C bus, RS232, or any other serial or parallel buses. Alternatively, switching devices may be controlled by drive controller "A" 404, drive controller "B" 406, or both. In another embodiment, switch control may employ bus "A" 410 and/or bus "B" 412. As such, switching devices may be controlled directly by host 402, by host 402 through drive controller "A" 410 or drive controller "B" 412, or may be controlled by drive controller "A" 410 or drive controller "B" 412. The architecture of FIG. 4 may employ a larger number of drives and switching devices than depicted. Switching devices can be individually configured for each drive such that each drive employs either bus "A" 410 or bus "B" 412. This allows communication to be maintained in the event of a bus failure, and allows loads to be balanced between buses. The architecture of FIG. 4 provides continued operation in the event of a bus, drive, or controller failure. Switching devices 424-432 may also allow drives to be isolated from both buses. In the event of a drive failure, or a failure that corrupts bus operation, an associated switching device may be configured to disconnect the drive from both buses. The switching methods shown in FIG. 4 may be applied to dual ported drives where each port of each drive may be selectively connected to bus "A" 410, bus "B" 412, or may be disconnected from both buses. Alternatively, a third bus may be employed to provide higher transfer rates in the event of a bus failure.

Figure 5:
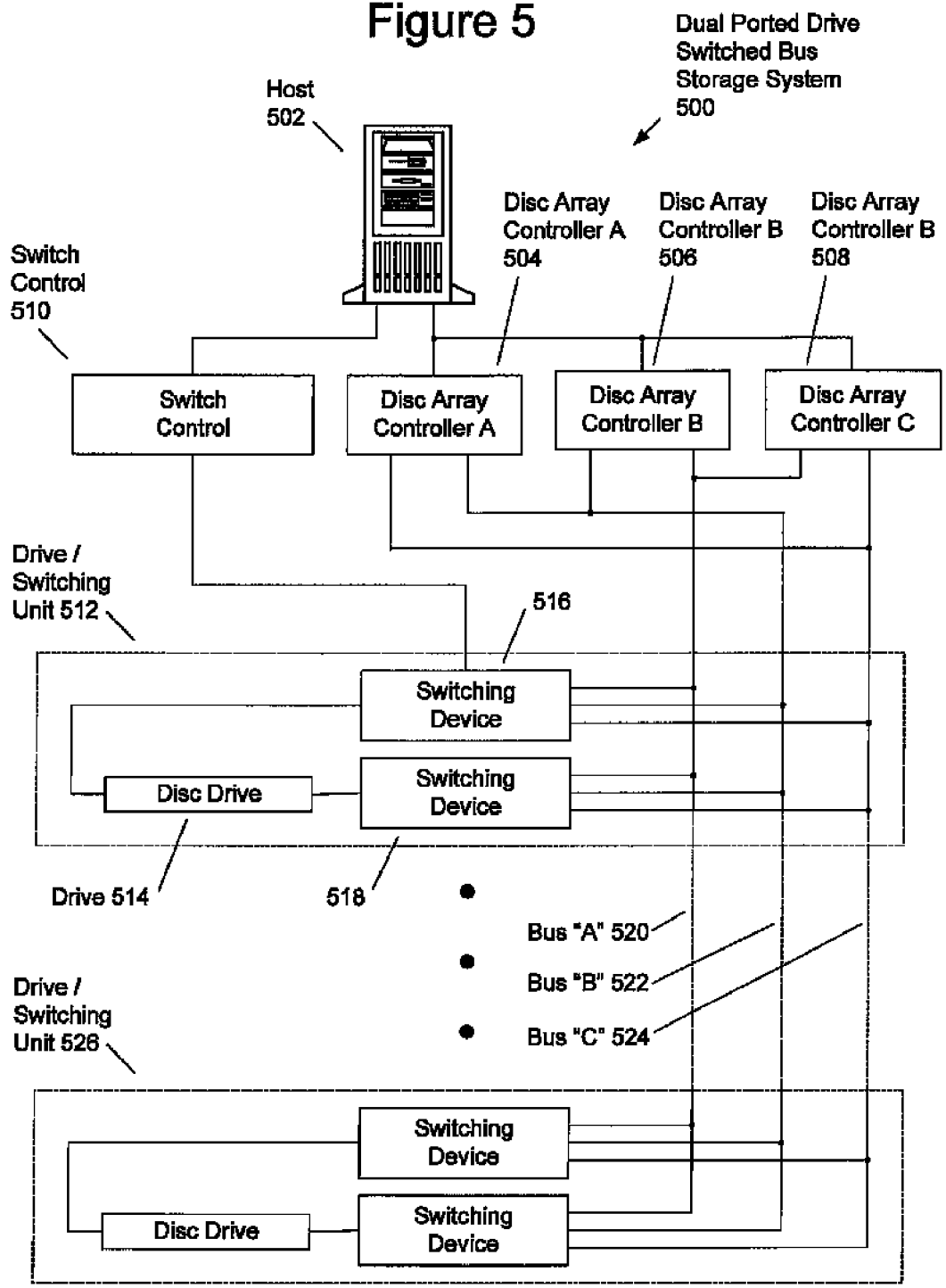
FIG. 5 depicts a storage system architecture employing switched dual-ported drives.

FIG. 5 depicts a storage system architecture employing switched dual-ported drives. System 500 comprises host 502, drive controller "A" 504, drive controller "B" 506, drive controller "C" 508, switch control 510, bus "A" 520, bus "B" 522, bus "C" 524 and a plurality of drive/switching units beginning with drive/switching unit 512 and ending with drive/switching unit 526. Embodiments are not limited to a specific number of drive/switching units. Drive/switching unit 512 comprises dual ported drive 514, first switching device 516 connected to a first port of drive 514 and second switching device 518 connected to a second port of drive 514. Switching device 516 allows the first port of drive 514 to be connected to bus "A" 520, bus "B" 522, or bus "C" 524. Similarly, switching device 518 allows the second port of drive 514 to be connected to bus "A" 520, bus "B" 522, or bus "C" 524. Switching devices are controlled through switch control 510 which may comprise control logic, a bus interface, such as I2C, for example, or other circuitry that allows host 502 to control the function of each switching device. Alternatively, switch control 510 may be connected to one or more drive controllers or one or more buses. Drive controller "A" 504, drive controller "B" 506, and drive controller "C" 508 are connected to host 502 by one or more buses and are dual ported that that they each provide two drive buses. Buses 520-524 are each connected to two ports of different drive controllers of drive controllers 504-508 in a manner such that all buses remain operational in the event of a failure of one drive controller that does not corrupt a bus. In another embodiment of the architecture of FIG. 5, switching devices connected to a first port of each drive are controlled by a first switch control and switching devices connected to the second port of each drive are connected to a second switch control. The first and second switch controls can be controlled directly by the host, can be controlled by the host through one or more drive controllers connected to the switch controls, or can be controlled by one or more drive controllers. Switching devices may be employed to connect drive ports to one of the buses or may be employed to isolate the port from all buses. Switching devices may comprise any devices configurable to provide the described function including switches, multiplexers, port controllers, cross-point switches, fabrics, etc.

The architecture of FIG. 5 allows system operation to continue after the failure of one or more drive controllers, drives, or buses. Additionally, the architecture of FIG. 5 allows data loads to be distributed among drive controllers and buses to optimize performance. Depending upon the number of drives, and the data rates of drives, the buses, and drive controllers, the architecture of FIG. 5 may provide near optimum performance following the failure of a drive, bus, or drive controller. As such the above architecture may be employed in systems where continued high performance is desired following failure of a bus of drive controller.

Figure 6:
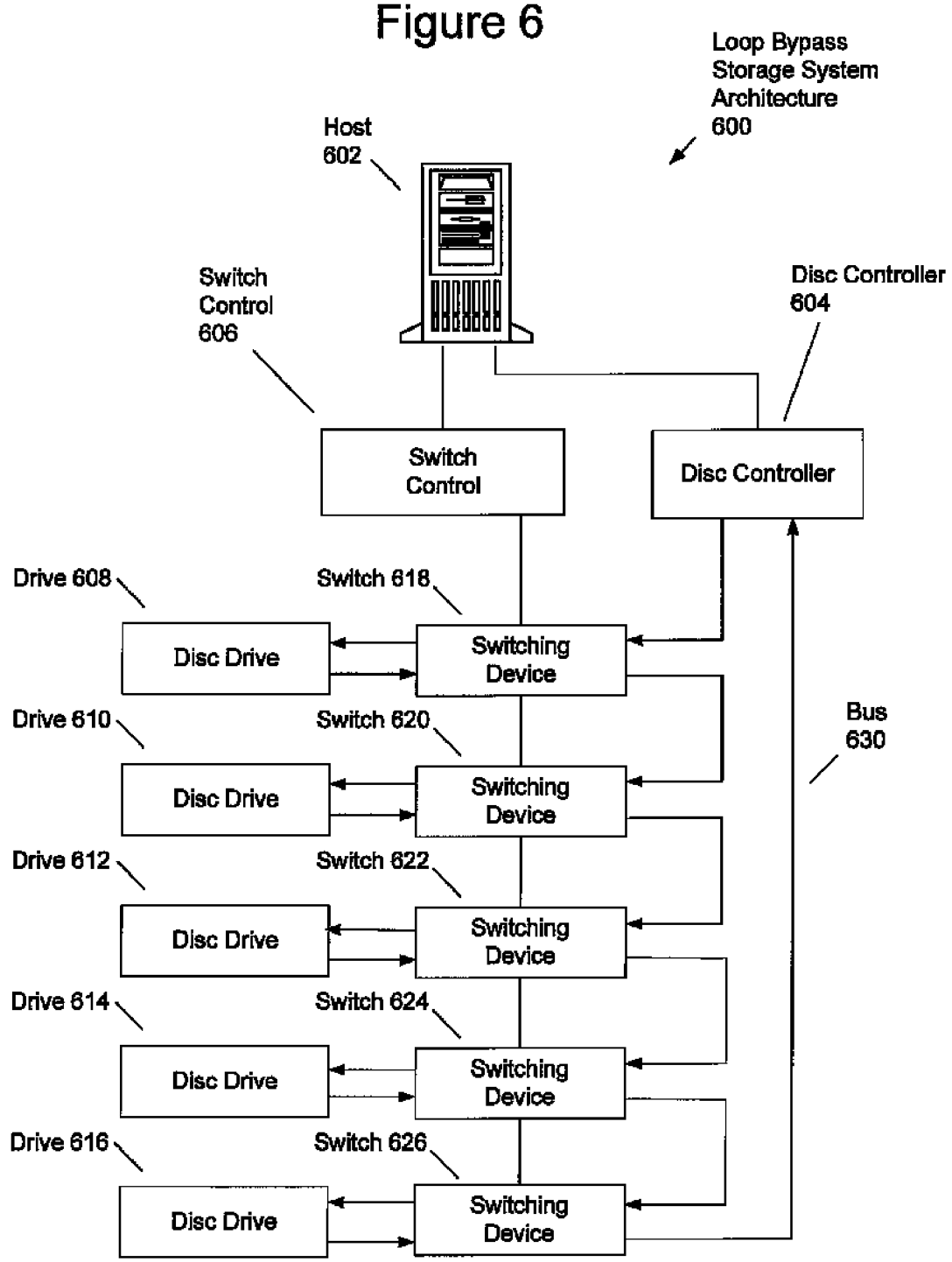
FIG. 6 depicts a loop bypass storage system architecture embodiment.

FIG. 6 depicts a loop-bypass storage system architecture. System 600 comprises host 602, drive controller 604, switch control 606, drives 608-616, switching devices 618-626 and bus 630. Drive controller 604 is connected to host 602 by one or more buses. Bus 630 serially connects drive controller 604 to each switching device of switching devices 618-626 that each either serially connect an associated drive to bus 630 or bypass the drive. When all switching devices are enabled, all drives are serially connected. Switching devices may be controlled by host 602 through switch controller 606 or by drive controller 604. The architecture depicted in FIG. 6 allows drive connections to be individually bypassed such that in the event of a drive failure, or a failure that affects bus operation, the failed drive may be bypassed and the system may continue to operate. Switching devices 618-626 may be any type of devices capable of serially connecting or bypassing drives. Switching devices 618-626 and switch control 606 may be implemented as a single unit. Switching devices 618-626 and switch control 606 may comprise a port bypass controller.

Figure 7:
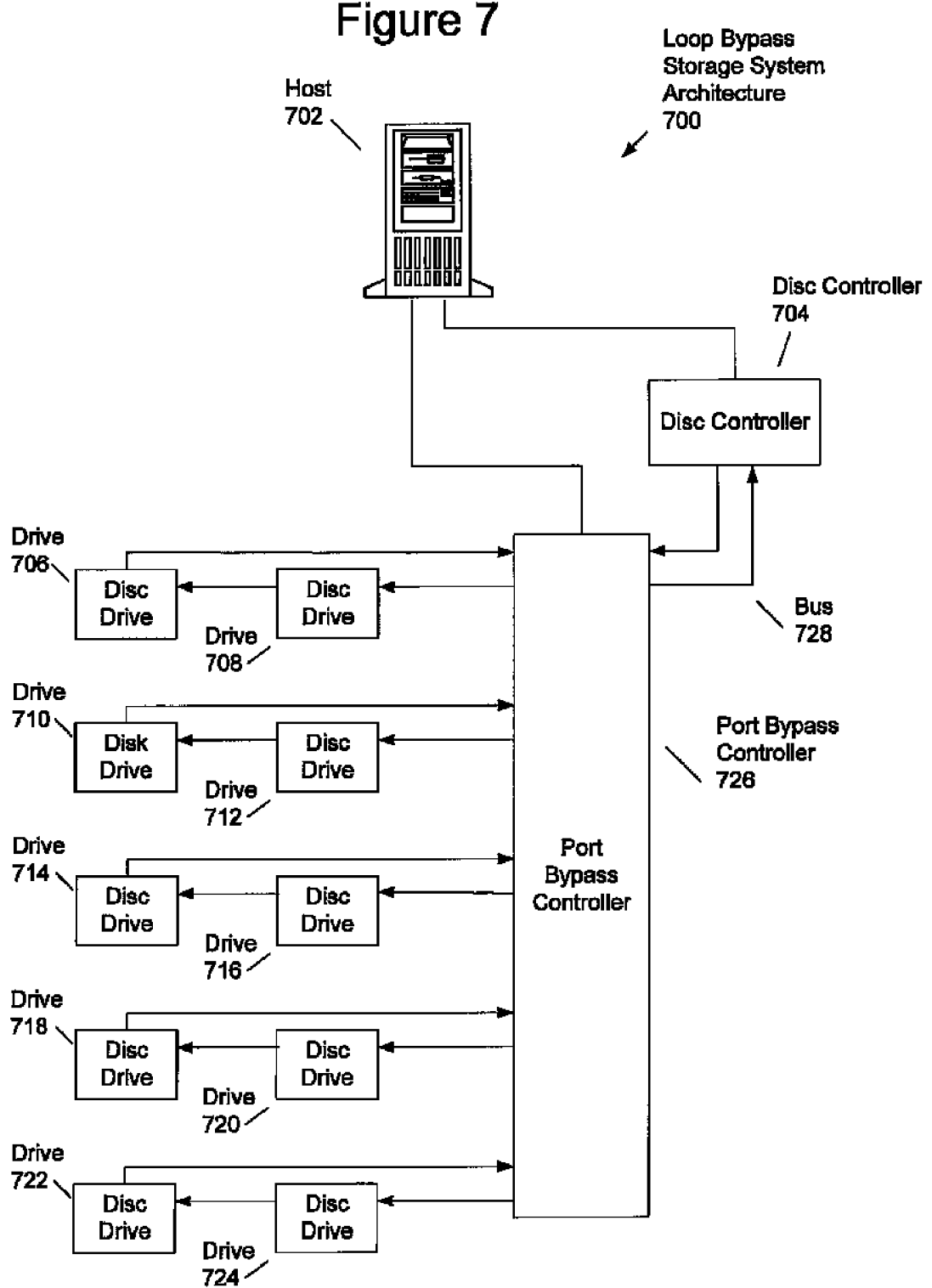
FIG. 7 depicts a loop bypass storage system with two drives connected to each bypass controller port.

Loop bypass methods may be employed to isolate one or more drives. More than one drive may be connected to each port of a port bypass controller. FIG. 7 depicts a loop bypass storage system with two drives connected to each bypass controller port. System 700 comprises host 702, drive controller 704, drives 706-724, port bypass controller 726, and bus 728. Drives are arranged in pairs such that drives 706,708 are connected to a first port of port bypass controller 726, drives 710,712 are connected to a second port, drives 714-716, are connected to another port, drives 718,720 are connected to yet another port, and drives 722,724 are connected to still another port. Bus 728 connects drive controller 704 to port bypass controller 726. In an alternative embodiment, two buses may connect the drive controller and port bypass controller, providing redundancy in the event of a bus failure. Any or the ports of port bypass controller 726 may be configured to allow signals to pass through the two drives connected to the port or to bypass the port, providing isolation in the event of a drive failure, or drive failure that corrupts the bus. While FIG. 7 depicts two drives connected to each port of port bypass controller 726, more than two drives may be connected within the scope of the present invention. While FIG. 7 employs a port bypass controller, any devices and configuration thereof that produce the described function may be employed.

Figure 8:
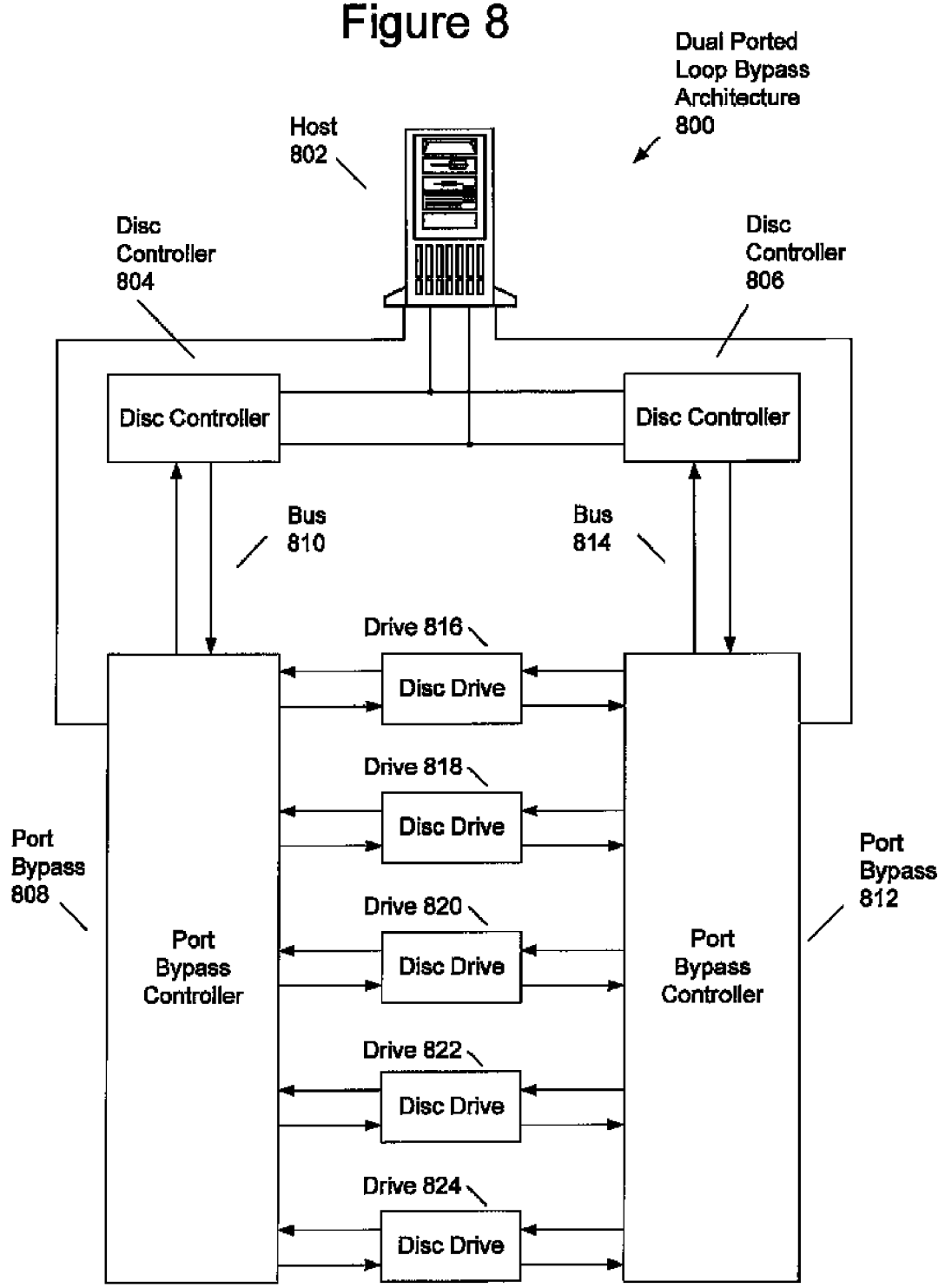
FIG. 8 depicts a loop bypass storage system with two dual ported drives connected to each port

Loop bypass architectures may employ a plurality of drives connected to each port wherein each drive is dual ported. FIG. 8 depicts a loop bypass storage system with two dual ported drives connected to each port. System 800 comprises host 802, drive controller 804, drive controller 806, port bypass controller 808, bus 810, port bypass controller 812, bus 814 and drives 816-824. Drive controller 804 and drive controller 806 are each connected to host 802 by one or more buses. Drive controller 804 is connected to port bypass controller 808 through bus 810. Drive controller 806 is connected to port bypass controller 812 through bus b. In an alternative embodiment, more than one bus may connect drive controller 804 to port bypass controller 808, and more than one bus may connect drive controller 806 to port bypass controller 812. In another embodiment, each drive controller may connect to both port bypass controllers. Drives 816-814 are dual ported and each drive has a first port connected to port bypass controller 808 and a second port connected to port bypass controller 812. As such, each drive may be individually configured to connect to a loop formed by bus 810 on one port, or bus 814 on the second port of the drive, or both buses. In the event of a drive failure, or drive failure that corrupts bus signals, the drive may be isolated through configuration of port bypass controller 808 or port bypass controller 812, or configuration of both port bypass controllers. In the event of a drive controller, bus failure, connector failure, or port bypass controller failure, data from drives may be accessed using the functioning drive controller, bus, or port bypass controller.

Figure 9:
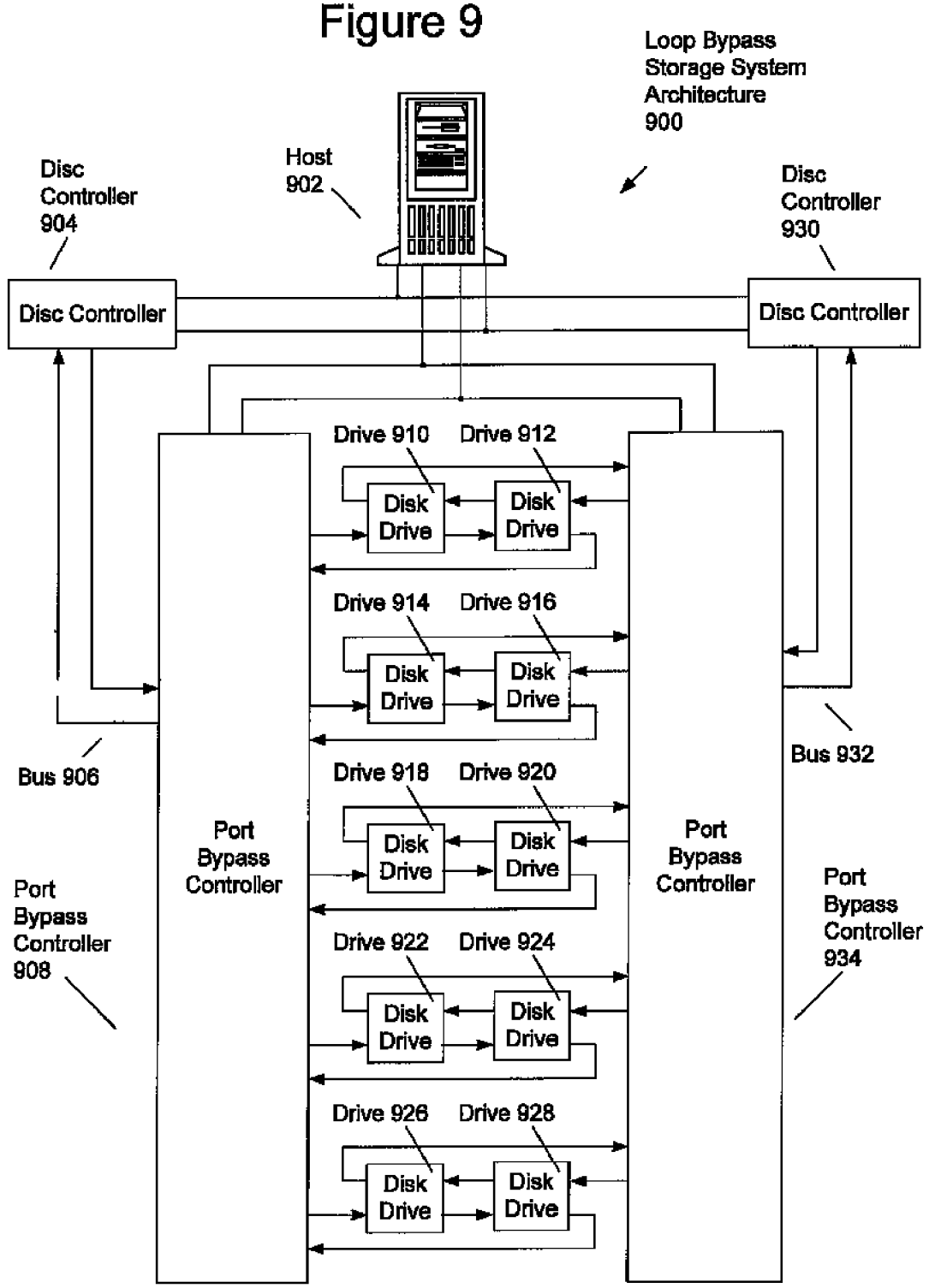
FIG. 9 depicts a loop bypass storage system with two dual ported drives connected to each port of a port bypass controller

Two or more dual ported drives may be connected to each port of a port bypass controller. FIG. 9 depicts a loop bypass storage system with two dual ported drives connected to each port of a port bypass controller. System 900 comprises host 902, drive controller 904, bus 906, port bypass controller 908, drives 910-928, drive controller 930, bus 932, and port bypass controller 934. Drive controller 904 and drive controller 930 are connected to host 902 by one or more buses. Drive controller 904 is connected to port bypass controller 908 through bus 906. Drive controller 930 is connected to port bypass controller 934 through bus 932. Drives 910-928 are dual ported and each drive has a first port connected to port bypass controller 908 and a second port connected to port bypass controller 934. In an alternative embodiment, drive controller 904 is also connected to port bypass controller 934 and drive controller 930 is also connected to port bypass controller 908. Port bypass controllers 908 and 934 are individually configurable to provide a connection to a drive port or to bypass a connection to a drive, allowing each drive to be isolated in the event or a drive failure or a failure that corrupts the port connection. Since drives are dual ported and two port bypass controllers are employed, the system of FIG. 9 provides continued operation in the event of a drive controller failure, bus failure, or drive failure.

Figure 10:
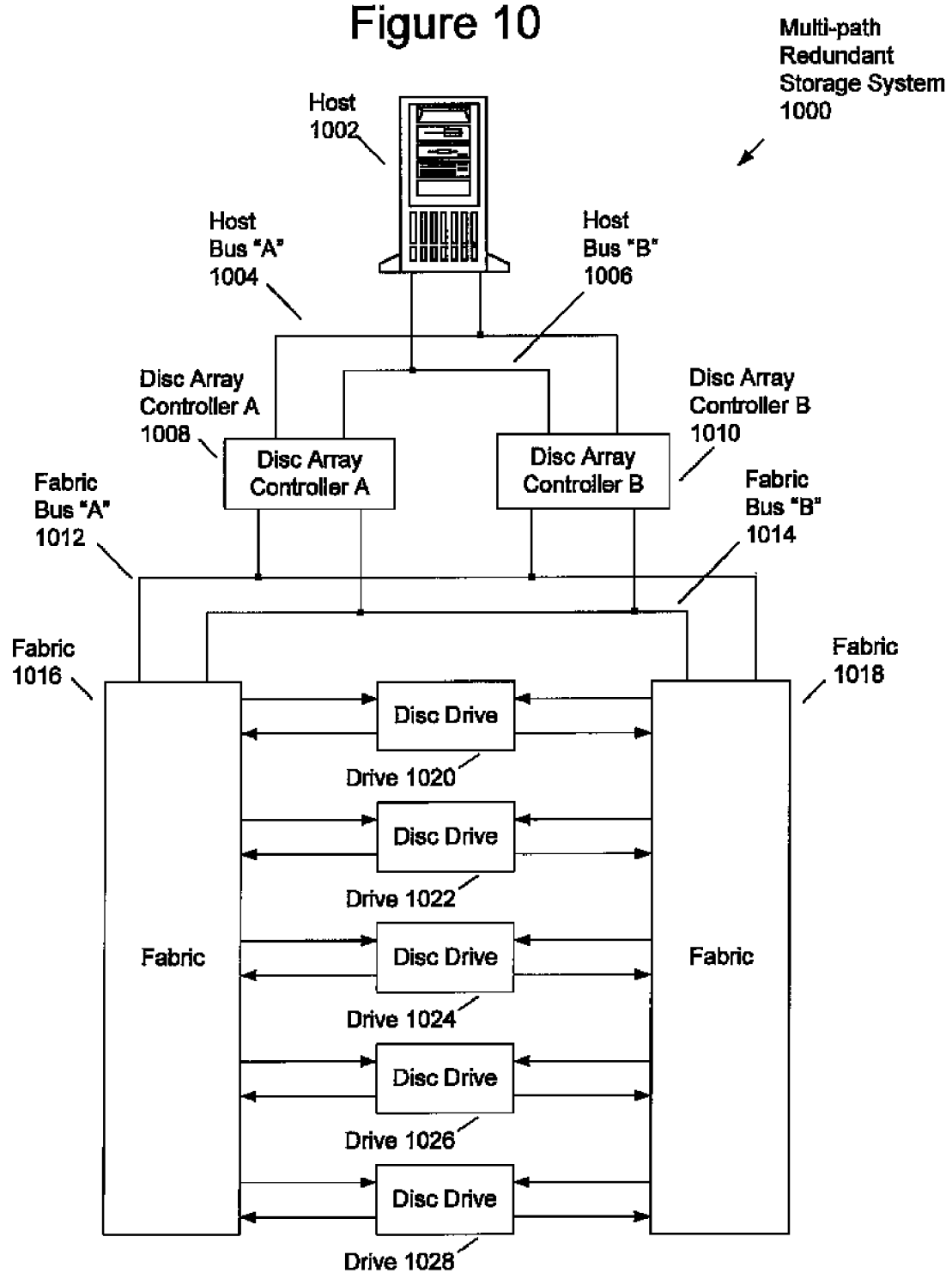
FIG. 10 depicts a multi-path redundant storage system.

FIG. 10 depicts a multi-path redundant storage system. System 1000 comprises host 1002, host bus "A" 1004, host bus "B" 1006, drive controller "A" 1008, drive controller "B" 1010, fabric bus "A" 1012, fabric bus "B" 1014, fabric "A" 1016, fabric "B" 1018, and drives 1020-1028. Drive controller "A" 1008 and drive controller "B" 1010 are both connected to host 1002 by host bus "A" 1004 and host bus "B" 1006. Drives 1020-1028 are each dual ported with a first port connected to fabric "A 1016 and a second port connected to fabric "B" 1018. Fabric "A" 1016 and fabric "B" 1018 may include any and all switch types and switching methods including fibre channel fabrics, switches, multiplexers, crosspoint switches, port bypass switches, and the like. Fabrics may have address mapped controls and may be controlled by host 1002 through either drive controller "A" 1008 or drive controller "B" 1010. Alternatively, a separate bus, or buses (not depicted), such as I2C, for example, may provide transfer of control and configuration information from host 1002 to fabric "A" 1016 and fabric "B" 1018. Further, fabric "A" 1016 and fabric "B" 1018 may be controlled and configured wholly or in part by drive controller "A" 1008 and/or drive controller "B" 1010. Configuration and control tasks may be shared between host 1002 and drive controller "A" 1008 and/or drive controller "B" 1010.

Figure 11:
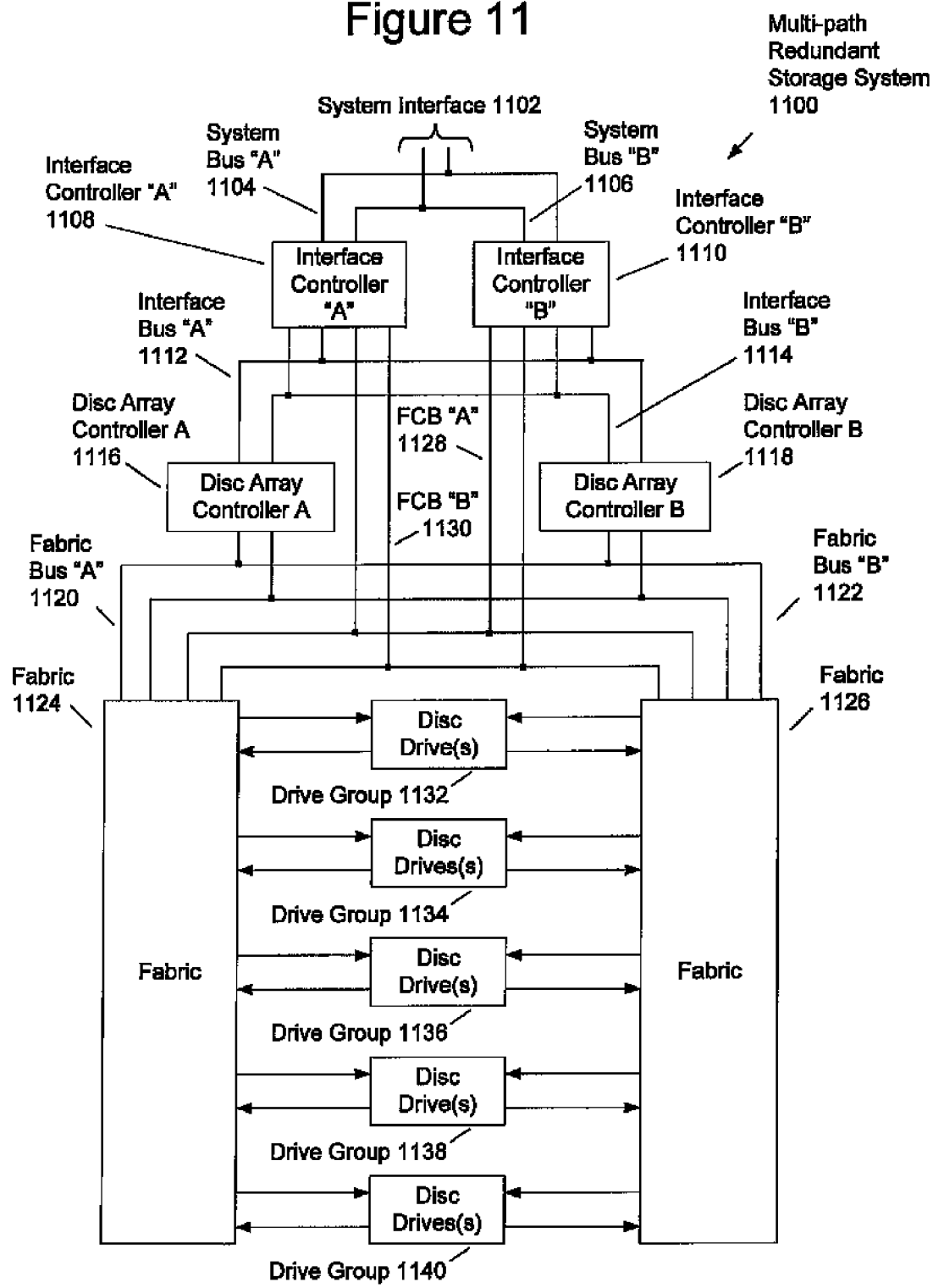
FIG. 11 depicts another multi-path redundant storage system.

FIG. 11 depicts another multi-path redundant storage system. System 1000 comprises system interface 1102, system bus "A" 1104, system bus "B" 1106, interface controller "A" 1108, interface controller "B" 1110, interface bus "A" 1112, interface bus "B" 1114, drive controller "A" 1116, drive controller "B" 1118, fabric bus "A" 1120, fabric bus "B" 1122, fabric "A" 1124, fabric "B" 1126, fabric control bus "A" 1128, fabric control bus "B" 1130, and drive groups 1132-1140. Interface controller "A" 1108 and interface controller "B" 1110 connect to a system through system bus "A" 1104 and system bus "B" 1106. The two system buses provide redundant communication paths, allowing continued communication with both interface controllers in the vent that one of the system buses fails. Interface controller "A" 1108 and interface controller "B" 1110 connect to drive controller "A" 1116 and drive controller "B" 1118 through interface bus "A" 1112 and interface bus "B" 1114 that allow continued communication between either interface controller and either drive controller in the event that one of the interface buses fails. Drive controller "A" 1116 and drive controller "B" 1118 are connected to fabric "A" 1124 and fabric "B" 1126 through fabric bus "A" 1120 and fabric bus "B" 1122, providing continued communication between either drive controller and either fabric in the event that one of the fabric buses fails. Fabric control bus "A" 1128 and fabric control bus "B" 1130 provide redundant control paths from interface controller "A" 1108 and interface controller "B" 1110 to fabric "A" 1124 and fabric "B" 1126 and allow configuration of either fabric by either interface controller in the event that either fabric control bus fails. Fabric "A" 1124 is connected to each drive group of drive groups 1132-1140 by separate connection. A drive group comprises one or more drives connected to a fabric by one connection. Drives in the drive groups are dual ported. Fabric "B" 1126 is connected to each drive group of groups 1132-1140 by separate connection. Fabric "A" 1124 connects to one port of the dual ported drive or drives comprising each drive group and fabric "B" 1126 connects to a second port of the dual ported drive or drives comprising each group. The duality of system buses, interface buses, fabric buses, fabric control buses, and drive group connections provides isolation or a redundant path for every data path in the system. The duality of interface controllers, drive controllers, and fabrics, in conjunction with the duality of buses, provides continued operation in the event of a failure of an interface controller, drive controller, or fabric. As such the system depicted in FIG. 11 has no single point of failure relative to buses, controllers, or fabrics.

Figure 12:
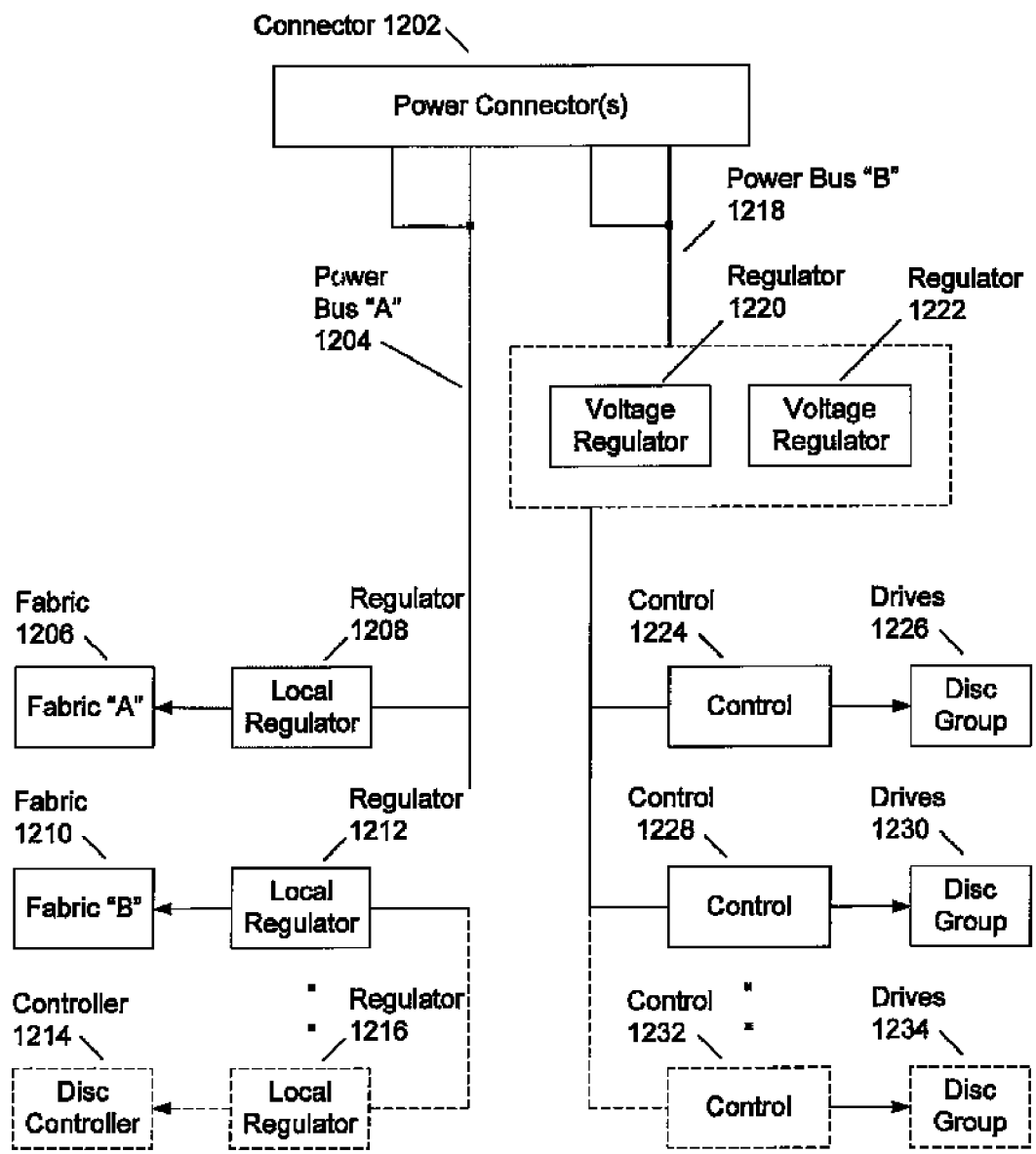
FIG. 12 depicts multi-path redundant storage system power distribution

In addition to buses, connectors, drives, fabrics and controllers, isolation and redundancy methods may further applied to power distribution in a storage system such that the system has no single point of failure that might render the system inoperative. FIG. 12 depicts multi-path redundant storage system power distribution. Power is supplied to the system through connector 1202. Alternatively, more than one connector may be employed. More than contact pin within a connector may provide a like voltage, providing a duality of paths in the event that one pin fails to make connection or has higher than desired resistance. Power bus "A" 1204 provides power to local regulator 1208, local regulator 1212, and optionally may provide power to one or more additional local regulators as indicated by local regulator 1216. Local regulator 1208 provides power to fabric "A" 1206. Local regulator 1212 provides power to fabric "B" 1210. Optional regulator 1216 may provide power to drive controller 1214. Other local regulator (not depicted) may provide power to additional drive controllers and to interface controllers, discrete circuitry, or other circuitry such as environmental monitors, for example. Local regulators may be employed to provide power regulated to a desired voltage to components such as integrated circuits that consume relatively low power as compared to drives. Systems having redundant interface controllers, drive controllers, and fabrics may employ local regulators for each component, providing continued system operation in the event that a single regulator fails since the redundant component may be employed to access data. Connector 1202 of FIG. 12 also provides one or more pins connected to power bus "B" 1218. Power bus "B" 1218 provides power to voltage regulators 1220 and 1222. Regulators 1220 and 1222 are connected in a manner that allows power to be provided by either regulator and may include isolation circuitry such as diodes or other components. Alternatively, regulators 1220 and 1222 may include input signals that may enable or disable each regulator. Regulators may be controlled by writeable registers, I2C buses, or other signal lines. Voltage regulators 1220 and 1222 provide regulated power to control 1224, control 1228, and optionally to one or more additional controls as indicated by control 1232. Control 1224 controls power to drive group 1226. Control 1228 controls power to drive group 1230. Control 1232 provides power to drive group 1234. Additional control units (not depicted) may control power to additional drive groups, or to other components such as environmental monitors, fans, or other components. Controls 1224, 1228, 1232 and other controls may comprise switches, fuses, breakers, transistors (including field effect transistors, SCRs (silicon controlled rectifiers) or any other devices employed to selectively apply power to a drive group or other components. Controls may include current and/or voltage sensing and may operate in an automatic manner or in response to a control signal. FIG. 12 illustrates that methods of power redundancy and isolation may be applied to data storage system components such that data remains available following the failure of a regulator, and that power to one or more drives in a group containing a failed drive may be shut off to conserve power in the system or to isolate components drawing excessive power. As previously noted, data from a failed drive or drive group may be copied or reconstructed and saved using spare capacity of functioning drives. As such, embodiments of the present invention can provide a data storage system that has no single point of failure that would result in data loss.

The foregoing figures have included switches, switching devices, port bypass switches, and fabrics to provide a configurable connection between data storage devices and drive controllers. The term fabric shall refer to any type of device that can provide a configurable connection between data storage devices and drive controllers and shall include fibre channel fabrics, switches, cross-point switches, multiplexers, port bypass controllers and other devices. A fabric may replace the depicted switches, switching devices, or port bypass controllers in the figures.

Embodiments of the present invention can be advantageously employed with a multiple drive assembly (MDA) that comprises a plurality of storage devices and that is inserted into or removed from a cabinet or other fixture as a single unit. The MDA may contain storage devices, may contain storage devices and fabrics, may contain storage devices, fabrics and drive controllers, or may contain data storage devices, fabrics, drive controllers and interface controllers. In other words, embodiments of the present invention as exemplified by the figures may be partitioned between components that are disposed in an MDA and components that are disposed in a cabinet, shelf or other fixture. Such partitioning may reflect MDA size, number of connectors, interface types, drive strength of bus signals, and other factors. In some embodiments, an MDA may employ transversely mounted storage devices where the devices are mounted with the longest axis of the body of at least one storage device orthogonal to the direction of insertion of the MDA into a cabinet, shelf or other fixture. These embodiments allow connectors of storage devices, such as drives, for example, to directly engage connectors disposed on a backplane, eliminating intermediate connectors, cables and the like and the additional possible points of failure introduced by intermediate connections.

Computer program code operating in a host system and/or one or more interface controllers, and/or one or more drive controllers is employed to configure fabrics of the present invention. Fabrics may be controlled by computer program code operating in one or more host computers. Such program code may include performance monitoring and load balancing functions. Configuration of fabrics may be performed as a result of a detected failure, or in response to other conditions including load, data type, data size, data storage format, desired response time, etc. as may reflect services provided such as transaction processing, or video streaming, for example. One or more drive controllers may control fabrics. Computer program code operating in a drive controller may configure fabrics in response to a failure or other condition. Configuration of fabrics may be shared between one or more host computers and one or more drive controllers. As previously noted, switch control may employ one or more control buses, such as I2C, may employ one or more drive buses, or both. Fabrics may be mapped as a device on one or more array buses and control signals for one or more fabrics may be conveyed across the drive array bus or buses. Some of the figures depict a separate switch control block. In some embodiments the switch control block may be a part of the fabric.

Figure 13:
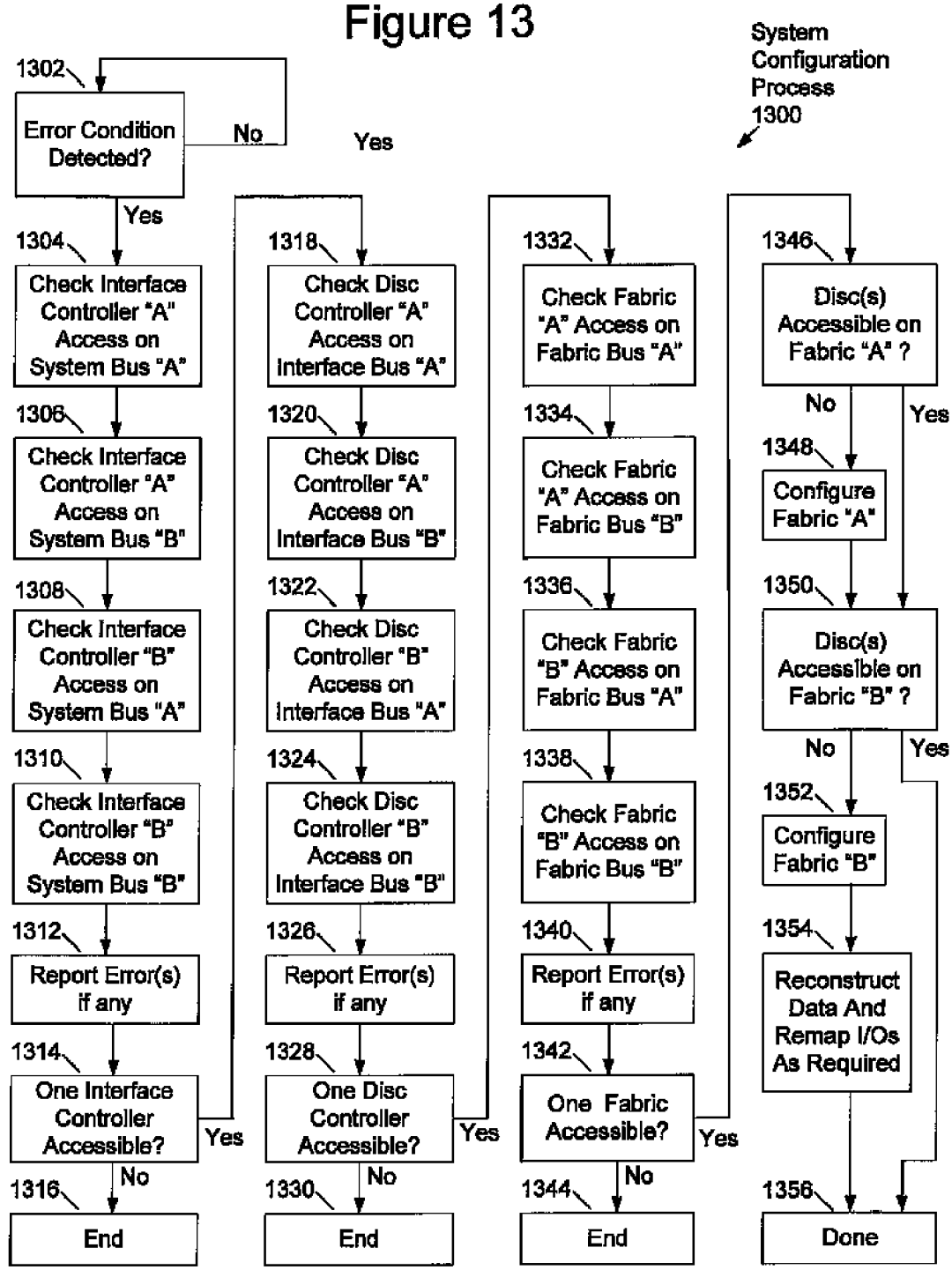
FIG. 13 depicts steps performed by system configuration computer program code operating in a host and/or drive controller

FIG. 13 depicts steps performed by system configuration computer program code operating in a host and/or drive controller. The process of FIG. 13 is applicable to systems like that shown in FIGS. 10 and/or 11. Process 1300 begins at step 1302 where a check is performed to determine if an error condition exists. An error condition may comprise an error such as a read or write error, for example, detected by a drive, drive controller, or host system. If the error is detected by a drive, the error may be reported to a drive controller and may be checked by a drive controller and/or may be forwarded to a host system. If a drive controller detects an error, the error may be checked and/or may be forwarded to a host system. Alternatively, an error may be detected by a host system. At step 1304, a test may be performed to determine if the host can communicate with interface controller "A" using system bus "A". At step 1306, a test may be performed to determine if the host can communicate with interface controller "A" using system bus "B". At step 1308, a test may be performed to determine if the host can communicate with interface controller "B" using system bus "A". At step 1310, a test may be performed to determine if the host can communicate with interface controller "B" using system bus "B". Steps 1304-1310 determine if a host or other system is able to communicate with interface controller "A and interface controller "B" using both system bus "A" and system bus "B". At step 1312, any errors detected in steps 1304-1310 are reported to a host or other system. At step 1314, a check is performed, such as reviewing reported errors, for example, to determine if the host or other system is able to communicate with at least one interface controller. If the host or other system is not able to communicate with at least one interface controller, the process ends at step 1316. If the check performed at step 1314 determines that the host or other system is able to communicate with at least one interface controller, the process continues at step 1318 where a test is performed to determine if drive controller "A" can be accessed using interface bus "A". This test may comprise reading drive controller registers. At step 1320, a test is performed to determine if drive controller "A" can be accessed using interface bus "B". At step 1322, a test is performed to determine if drive controller "B" can be accessed using inter-face bus "A". At step 1324, a test is performed to determine if drive controller "B" can be accessed using interface bus "B". At step 1326, any errors detected in steps 1318-1324 are reported. At step 1326, test results are checked to determine if at least one drive controller can be accessed. If no drive controllers can be accessed, the process ends at step 1330. If at least one drive controller can be accessed, the process continues at step 1332 where a test is performed to determine if fabric "A" can be accessed using fabric bus "A". At step 1334 a test is performed to determine if fabric "A" can be accessed using fabric bus "B". At step 1336 a test is performed to determine if fabric "B" can be accessed using fabric bus "A". At step 1338 a test is performed to determine if fabric "B" can be accessed using fabric bus "B". At step 1340, any errors detected in steps 1332-1338 are reported. At step 1342, test results are check to determine if at least one fabric is accessible. If no fabrics are accessible, the process ends at step 1344. If at least one fabric is accessible, the process continues at step 1346. At step 1346 a test is performed to determine if fabric "A" can access all attached drives. Such tests may comprise reading and/or writing drive registers and/or reading and/or writing data to the drive media. If not all drives are accessible or are not operating properly, fabric "A" may be configured to isolate one or more drives in step 1348 and then the process continues at step 1350. If the test performed in step 1346 determines all drives are accessible and are operating properly, the process continues at step 1350. At step 1350, a test is performed to determine if fabric "B" can access all attached drives. If some drives are not accessible, or are not operating properly, fabric "B" may be configured to isolate one or more drives in step 1352 and the process then continues at step 1354. At step 1354, data from inaccessible or failed drives may be reconstructed or copied and stored on other drives or may be stored on another system such that fault tolerance is provided. I/O commands may be remapped to utilize functioning interface controllers, drive controllers, or fabrics, as identified by pervious tests. The process then ends at step 1356. If the test performed in step 1350 determines that all drives are accessible and operating properly, the process ends at step 1356. The results of tests performed may also be employed to configure power circuitry such as depicted in FIG. 12 such that power is not applied to failed components. The tests performed, the order of tests performed, configuration of fabrics and reconstruction of data and remapping of I/Os may be varied depending on the architecture of the storage system including the number of host buses, interface controllers, drive controllers, number and type of fabrics, and number of drives including the number of drives attached to each port of the fabric or fabrics. The type of error reported may be used to select a test or set of tests. Alternatively, following a reported error, a range of tests may be run to determine the overall condition of a storage subsystem. A hierarchical order of tests may exist wherein operation of various system components is performed in a predetermined order. The tests performed in FIG. 13 may be executed by a host or other system, or may be executed by components within a storage subsystem. Computer program code performing tests may be resident in individual components of the system or may be transferred from other systems or other components. Tests may include execution of self-test computer program code in components. For example, drives may include a power-on self test routine and such routing may be invoked as part of the tests performed in FIG. 13 to check operation of drives.

Embodiments of the present invention can be employed to provide maintenance free multiple drive storage assemblies that can be installed and removed in fixtures such as storage cabinets, bays, shelves, and the like. The multiple interface controllers, drive controllers, buses and fabrics allow continued operation following failure of a drive, drive controller, interface controller, connector, or bus. Systems with a large number of drives may employ a third bus as illustrated in FIG. 5 such that system performance can remain high following failure of a bus or drive controller. Various permutations of the disclosed embodiments, including the number of drives, drive controllers, interface controllers, buses, type of switching devices and control thereof may be employed within the spirit of the present invention.

The foregoing description has employed various descriptions employing drives and drive controllers to illustrate embodiments of the present invention. Embodiments of the present invention are not limited to a specific number of data storage devices and are not limited to the type of data storage device, including storage media type and bus type. Drive controller shall refer to any type of controller employed to access data from storage devices. Drive controllers may also provide fault tolerant data formatting functions such as RAID, ECC, or other formats. Data storage drives may comprise any type of data storage device including electrical, magnetic, optical, or chemical data storage devices including but not limited to hard disc drives, optical drives, RAM drives including solid state memory devices, and the like and may include combinations thereof and further may include combinations of volatile and non-volatile data storage devices. The fabric or fabrics interconnecting one or more drive controllers and one or more storage devices may be any device or devices that allows configurable connections between drive controllers and storage devices and may include interface type and data format translation. For example, a fabric may convert serial attached SCSI storage device data and interface signals into fibre channel signals that are communicated to a controller. Interface controllers may provide interface type and data format conversion and may also execute computer program code to configure one or more fabrics.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An apparatus that communicates access commands via a bus between a storage controller and a storage array, the storage array defined by a plurality of groups of data storage devices, there being two or more data storage devices in each group, the apparatus comprising a fabric having address mapped controls that are selectively configurable in connecting the bus to the storage array, each of the groups of data storage devices connected to the first fabric via respective separate and uniquely addressable connections of the first fabric.

2. The apparatus of claim 1 comprising an interface controller communicating commands between a remote device and the storage array via the bus.

3. The apparatus of claim 1 wherein the fabric is configurable by the storage controller.

4. The apparatus of claim 2 wherein the fabric is configurable by the interface controller.

5. The apparatus of claim 2 wherein the fabric is configurable by the remote device.

6. The apparatus of claim 1 wherein each of the data storage devices is dual ported, one port of each data storage device being in operable communication with the first fabric.

7. A method comprising:
forming a multiple device assembly by each of a plurality of groups of data storage devices, there being two or more data storage devices in each group;
connecting a first group of the plurality of groups in communication with a first fabric via a selected uniquely addressable connection of the first fabric;
connecting a second group of the plurality of groups in communication with the first fabric via another selected uniquely addressable connection of the first fabric;
determining whether the devices in the first group and the devices in the second group are communicatively accessible via the first fabric; and
when the determining step indicates one of the devices in the first group is not communicatively accessible via the first fabric, configuring the first fabric to isolate the first group from ongoing communications via the first fabric while enabling ongoing communications with the second group via the first fabric.

8. The method of claim 7 further comprising:
connecting the first group of the plurality of groups in communication with a second fabric via a selected uniquely addressable connection of the second fabric;

connecting the second group of the plurality of groups in communication with the second fabric via another selected uniquely addressable connection of the second fabric;

determining whether the devices in the first group and the devices in the second group are communicatively accessible via the second fabric; and when the determining step indicates one of the devices in the first group is not communicatively accessible via the second fabric, configuring the fabric to isolate the first group from ongoing communications via the second fabric while enabling ongoing communications with the second group via the second fabric.

9. The method of claim 7 comprising connecting a storage controller in communication with the multiple device assembly via a bus and the first fabric at least one of the determining and configuring steps controlled by the storage controller.

10. The method of claim 7 comprising connecting an interface controller communicating commands between a remote device and the multiple device assembly via a bus and the first fabric, at least one of the determining and configuring steps controlled by the interface controller.

11. The apparatus of claim 1 wherein the fabric is characterized as a first fabric, the apparatus comprising a second fabric having address mapped controls that are selectively configurable in connecting the bus to the storage array, each of the groups of data storage devices also connected to the second fabric via respective separate and uniquely addressable connections.

12. The apparatus of claim 11 comprising redundant storage controllers communicating with the storage array via redundant busses, both busses communicatively connected to each of the first fabric and the second fabric, and an interface controller communicating commands between a remote device and the storage array via at least one of the busses and at least one of the fabrics.

13. The apparatus of claim 12 wherein the fabrics are individually configurable by at least one of the storage controllers.

14. The apparatus of claim 12 wherein the fabrics are individually configurable by the interface controller.

15. The apparatus of claim 12 wherein the fabrics are individually configurable by the remote device.

16. The apparatus of claim 11 wherein each of the data storage devices is dual ported, one port of each data storage device being in operable communication with the first fabric and one port of each data storage device being in operable communication with the second fabric.

17. An apparatus that communicates access commands via a bus between a storage controller and a storage array, the storage array defined by a plurality of data storage devices, the apparatus comprising a fabric having address mapped controls that are selectively configurable in connecting the bus to the storage array, each of the data storage devices connected to the first fabric via respective separate and uniquely addressable connections of the first fabric.

18. The apparatus of claim 17 wherein the fabric is characterized as a first fabric, the apparatus comprising a second fabric having address mapped controls that are selectively configurable in connecting the bus to the storage array, each of the data storage devices also connected to the second fabric via respective separate and uniquely addressable connections.

* * * * *